United States Patent
Moritz et al.

(10) Patent No.: US 8,826,729 B2
(45) Date of Patent: Sep. 9, 2014

(54) METHOD AND DEVICE FOR DETECTING A REPLACEMENT OF PENCIL GLOW PLUGS IN AN INTERNAL COMBUSTION ENGINE

(75) Inventors: Rainer Moritz, Filderstadt (DE); Dirk Stockmann, Asperg (DE); Carsten Scholten, Stuttgart (DE); Peter Kappelmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/820,983

(22) PCT Filed: Aug. 1, 2011

(86) PCT No.: PCT/EP2011/063228
§ 371 (c)(1),
(2), (4) Date: May 14, 2013

(87) PCT Pub. No.: WO2012/034772
PCT Pub. Date: Mar. 22, 2012

(65) Prior Publication Data
US 2013/0228007 A1    Sep. 5, 2013

(30) Foreign Application Priority Data
Sep. 14, 2010   (DE) .......................... 10 2010 040 682

(51) Int. Cl.
*G01M 15/04* (2006.01)
*F02P 19/02* (2006.01)
*F02P 17/00* (2006.01)

(52) U.S. Cl.
CPC .............. *G01M 15/042* (2013.01); *F02P 19/02* (2013.01); *F02P 19/027* (2013.01); *F02P 19/025* (2013.01); *F02P 17/00* (2013.01)
USPC ..................................... 73/114.58; 73/114.62

(58) Field of Classification Search
USPC ......................................... 73/114.58, 114.62
See application file for complete search history.

(56) References Cited

U.S. PATENT DOCUMENTS 7,431,004 B2 * 10/2008 Kernwein et al. ......... 123/145 A
7,886,587 B2 * 2/2011 Moritz et al. .............. 73/114.62

(Continued)

FOREIGN PATENT DOCUMENTS

| DE | 10 2008 007398 | 8/2009 |
| DE | 10 2008 002574 | 1/2010 |
| EP | 1 762 724 | 3/2007 |
| EP | 2 189 651 | 5/2010 |

OTHER PUBLICATIONS

International Search Report for PCT/EP2011/063228, dated Oct. 14, 2011.

*Primary Examiner* — Freddie Kirkland, III
(74) *Attorney, Agent, or Firm* — Kenyon & Kenyon LLP

(57) ABSTRACT

In a method for detecting a replacement of sheathed-element glow plugs in an internal combustion engine, an electrical parameter of the sheathed-element glow plug is determined during a driving cycle and is compared with a stored value of the same electrical parameter of the sheathed-element glow plug that was determined in a preceding driving cycle. In the driving cycle, the same electrical parameter is determined for all sheathed-element glow plugs installed in the internal combustion engine, and the determined pattern of the electrical parameter is compared with a pattern that was ascertained in a preceding driving cycle, a replacement of a sheathed-element glow plug being detected if the pattern of the driving cycle deviates from a pattern of the preceding driving cycle.

7 Claims, 1 Drawing Sheet

(56) References Cited

U.S. PATENT DOCUMENTS

| | | | |
|---|---|---|---|
| 8,082,090 B2* | 12/2011 | Kernwein et al. | 701/102 |
| 8,423,197 B2* | 4/2013 | Sakurai et al. | 700/296 |
| 8,552,751 B2* | 10/2013 | Kernwein | 324/693 |
| 2007/0056545 A1* | 3/2007 | Kernwein et al. | 123/145 A |
| 2008/0319631 A1* | 12/2008 | Kernwein et al. | 701/102 |
| 2009/0193882 A1* | 8/2009 | Moritz et al. | 73/114.62 |
| 2010/0161150 A1* | 6/2010 | Sakurai et al. | 700/296 |

* cited by examiner

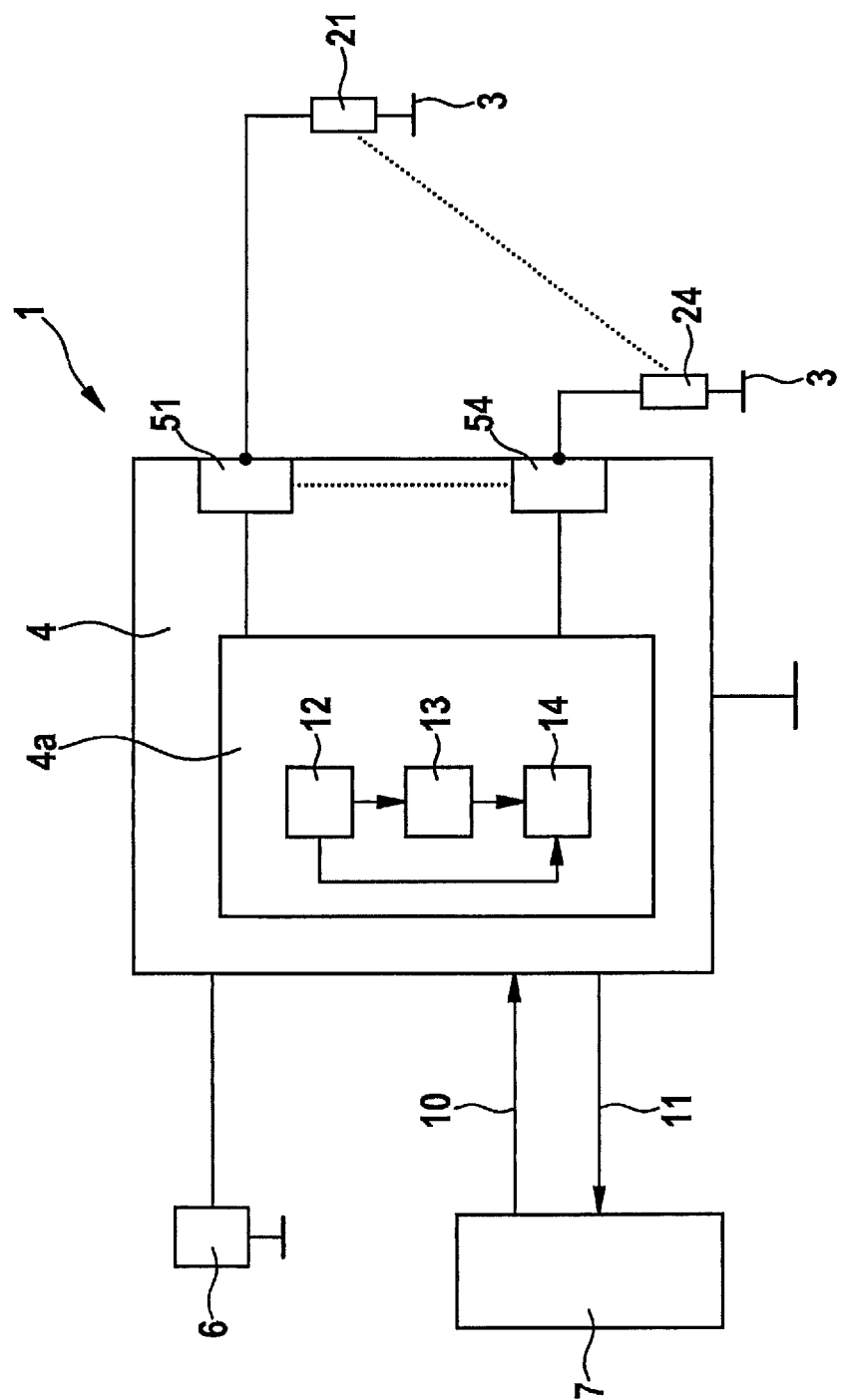

METHOD AND DEVICE FOR DETECTING A REPLACEMENT OF PENCIL GLOW PLUGS IN AN INTERNAL COMBUSTION ENGINE

BACKGROUND OF THE INVENTION

1. Field of the Invention

The present invention relates to a method for detecting a replacement of sheathed-element glow plugs in an internal combustion engine, in which at least one electrical parameter of the sheathed-element glow plug is determined during a driving cycle and is compared with a stored value of the same electrical parameter of the sheathed-element glow plug that was determined in a preceding driving cycle; and to an apparatus for carrying out the method.

2. Description of the Related Art

Published German patent application document DE 10 2008 007 398 A1 discloses a method and an apparatus for detecting the replacement of sheathed-element glow plugs in an internal combustion engine, in which, at the beginning of a driving cycle, at least one electrical characteristic value of at least one sheathed-element glow plug is measured, a present value of that characteristic value is determined and is compared with at least one stored value of the same electrical characteristic value of that sheathed-element glow plug that was determined at the beginning of at least one preceding driving cycle, and in which, if the deviation of the present value from the stored value exceeds a predefinable threshold value, a plug replacement is detected. Current, resistance, and/or electrical-power profiles or individual defined values are utilized for an individual-plug evaluation of this kind, by the fact that these profiles and/or values from the present driving cycle and the preceding one are compared. Because these individual-plug current, resistance, and/or electrical-power profiles greatly depend on environmental conditions, it is difficult always to evaluate them accurately, since the environmental conditions cannot always necessarily be set identically in the various driving cycles.

These individual current, resistance, and electrical-power profiles and/or values of each sheathed-element glow plug depend on the age of the plug, on environmental conditions (engine operating conditions), and on the applied voltage. These differences exist for sheathed-element glow plugs of identical type.

BRIEF SUMMARY OF THE INVENTION

The underlying object of the invention is thus to describe a method and an apparatus for detecting a replacement of sheathed-element glow plugs in an internal combustion engine, which enable accurate detection of the replacement of the sheathed-element glow plug independently of environmental conditions.

According to the present invention, the object is achieved in that in the driving cycle, the same electrical parameter is determined for all sheathed-element glow plugs installed in the internal combustion engine, these electrical parameters of the sheathed-element glow plugs behaving in a specific pattern with respect to one another, and this pattern of the electrical parameter of the sheathed-element glow plugs being compared with a pattern that was ascertained in a preceding driving cycle, a replacement of a sheathed-element glow plug being detected if the pattern of the driving cycle deviates from a pattern of the preceding driving cycle. This means that if a sheathed-element glow plug has a higher current value and/or power value at full load as compared with another sheathed-element glow plug, it must have a higher current value and/or power value than the other sheathed-element glow plug at idle as well. This continuity in the electrical parameters is evaluated in order to detect the replacement of the sheathed-element glow plugs. This has the advantage that a considerable improvement is achieved in terms of the robustness with which the replacement of the sheathed-element glow plugs is detected.

Advantageously, the pattern of the sheathed-element glow plugs is determined by way of the orders of magnitude of the electrical parameter measured at the various sheathed-element glow plugs. Consideration of the respective magnitude ratio, which is maintained in every operating state, makes it possible to detect particularly easily which individual plug has been exchanged.

In an embodiment, the at least one electrical parameter of all sheathed-element glow plugs is measured at approximately the same point in time. This ensures that the measurement occurs for all sheathed-element glow plugs in the same operating state of the internal combustion engine.

In a further development, the pattern of the electrical parameters of the sheathed-element glow plugs is stored over multiple driving cycles, and a plug replacement is detected from the discontinuity of the pattern with the stored pattern. As a result, present deviations can be compared with a history, so that a natural aging profile of the sheathed-element glow plugs can be blocked out.

In a variant, the electrical parameter is a current and/or a resistance and/or a power level of the sheathed-element glow plug. A very wide variety of individual-plug parameters can thus be utilized in order to create a pattern of the sheathed-element glow plugs installed in the internal combustion engine.

In a variant, the resistance is a cold resistance, a hot resistance, and/or a resistance change. A change in these values on the one hand offers a reliable indication of a plug change. At the same time, these values are comparatively simple to measure and are usually already sensed in a sheathed-element glow plug control system.

In a further development, the invention relates to an apparatus for detecting the replacement of sheathed-element glow plugs in an internal combustion engine, having a measurement unit for measuring at least one electrical parameter of a sheathed-element glow plug and a memory unit for storing the at least one electrical parameter of a sheathed-element glow plug. In an apparatus that furnishes an accurate result of the identification of the replacement of the sheathed-element glow plug independently of environmental conditions, the measurement unit measures at least one electrical parameter of all sheathed-element glow plugs installed in the internal combustion engine, and the memory unit stores the measured values of the at least one electrical parameter of all sheathed-element glow plugs, and a pattern recognition unit connected to the measurement unit and to the memory unit determines the pattern that is constituted by the at least one electrical parameter of all sheathed-element glow plugs and compares it with the pattern resulting from the stored values of the at least one parameter of the sheathed-element glow plugs, and detects a replacement of a sheathed-element glow plug if the pattern of the measured values deviates from the pattern of the stored values. Evaluation of the pattern has, in this context, the advantage that if a sheathed-element glow plug has a lower current and power consumption as compared with another sheathed-element glow plug, for example, at idle, it has a lower current and power consumption as compared with the other sheathed-element glow plug under full load as well, regardless of the actual absolute value. Replacement can thus be detected more robustly by comparing the pattern of the current and power consumption of the sheathed-element glow plugs among one another, than if each plug is merely compared by itself. Because different plug types having the same geometrical dimensions exist, incorrectly installed sheathed-element glow plugs with an incorrectly applied voltage can be immediately detected. This incorrectly applied voltage results in an incorrect plug temperature, with the consequence that if the sheathed-element glow plug becomes too hot, it is destroyed; this can result in engine damage. If the sheathed-element glow plug is too cold, this has a negative influence on the combustion behavior of the engine. Evaluation of the pattern allows such deleterious effects to be reliably suppressed. In addition, a service person need not actively communicate plug replacement to an engine control unit and/or glow time control unit that executes sheathed-element glow plug control. Software algorithms that are based on the aging-related behavior of the individual-plug parameters can react correctly to the sheathed-element glow plug replacement, and do not cause malfunctions.

BRIEF DESCRIPTION OF THE DRAWING

FIG. 1 is a schematic depiction of a glow plug system in a motor vehicle.

DETAILED DESCRIPTION OF THE INVENTION

At ambient temperatures below 40° C., cold internal combustion engines, in particular diesel engines, require a starting aid in order to ignite the fuel-air mixture introduced into the internal combustion engine. Glow plug systems, which are made up of sheathed-element glow plugs, a glow time control unit, and a glow plug software program that is stored in an engine control unit or in the glow time control unit, are used as a starting aid. In addition, glow plug systems are also used to improve the vehicle's emissions. Further areas of utilization of the glow plug system are in the burner exhaust gas system, for auxiliary heating, fuel preheating, or coolant water preheating.

FIG. 1 shows a glow plug system of this kind in which multiple sheathed-element glow plugs 2 to 24 are present, each sheathed-element glow plug 21 to 24 projecting into a respective cylinder of a combustion chamber (not further depicted) of the internal combustion engine. Sheathed-element glow plugs 21 to 24 are of identical construction and represent usual low-voltage sheathed-element glow plugs. In FIG. 1, sheathed-element glow plugs 21 to 24 are depicted for simplicity as equivalent resistors that lead to ground 3 of the internal combustion engine.

Sheathed-element glow plugs 21 to 24 are connected to a glow time control unit 4 that has a power semiconductor 51 to 54 for each sheathed-element glow plug 21 to 24. Glow time control unit 4 encompasses a microcontroller 4a to process incoming and outgoing signals. Alternatively, an ASIC can also be used instead of microcontroller 4a. Also connected to glow time control unit 4 is a vehicle electrical system voltage 6 that supplies sheathed-element glow plugs 21 to 24 with the necessary effective voltage via power semiconductors 51 to 54. Glow time control unit 4 leads to an engine control unit 7 that is in turn connected to the internal combustion engine (not further depicted). Engine control unit 7 and glow time control unit 4 have an interface. This interface can be made up of both a single-wire and a two-wire connection 10, 11 (FIG. 1). Data are exchanged between engine control unit 7 and glow time control unit 4 through this interface, both control application to glow time control unit 4 and diagnostic communication being performed through it. Glow time control unit 4 delivers to sheathed-element glow plugs 21 to 24, via power semiconductors 51 to 54, a pulse width modulated output signal that establishes the necessary sheathed-element glow plug control voltage at the respective sheathed-element glow plug 21 to 24.

Glow time control unit 4 encompasses a measurement unit 12, a memory unit 13, and a pattern recognition unit 14.

In order to detect the replacement of a sheathed-element glow plug 21 to 24 in the internal combustion engine, glow time control unit 4, in particular microcontroller 4a, now outputs a signal at which the electrical current at all sheathed-element glow plugs 21 to 24 is measured by measurement unit 12 contained in microcontroller 4a, for example in the idle operating state. This occurs at the beginning of a driving cycle of the motor vehicle. The electrical current values of all sheathed-element glow plugs 21 to 24 measured by measurement unit 12 are stored in memory unit 13. In the subsequent driving cycle a further signal is outputted, likewise at the beginning of the driving cycle, so that measurement unit 12 once again measures the current values of sheathed-element glow plugs 21 to 24. This can occur, this time, at full load. The environmental conditions of the motor vehicle play no further role in this type of measurement. Values stored in memory unit 13 for the current values of all sheathed-element glow plugs 21 to 24 recorded in the first driving cycle are then compared by pattern recognition unit 14 with all current values of sheathed-element glow plugs 21 to 24 that were supplied by measurement unit 12 in the second driving cycle.

The current values exhibit, in terms of their magnitude ratios with respect to one another, a specific pattern that is of the same nature at idle as under full load. If a sheathed-element glow plug has not been replaced, the orders of magnitude of the individual current values of sheathed-element glow plugs 21 to 24 are the same for both the stored values and the values measured again in the second cycle. If these magnitude ratios of sheathed-element glow plugs 21 to 24 shift with respect to one another, however, it is assumed that a sheathed-element glow plug has been replaced.

This will be explained further by way of the example that follows. During the first driving cycle, for example, a plug current In (where n=1 to 4) was measured at a plug voltage U=5 V at sheathed-element glow plugs 21 to 24 (a total of four sheathed-element glow plugs). The stored values were I1=3.2 A, I2=3.1 A, I3=3.2 A, I4=3.5 A.

In the second measurement that was performed by measurement unit 12, a plug voltage U=7 V was applied. The following plug currents were measured in this context: I1=3.7 A, I2=3.5 A, I3=3.7 A, I4=4.0 A.

This yields the following pattern as a function of the magnitude of the individual measured values:

$$I2 < I1 = I3 < I4.$$

Because the same pattern of plug current was generated by sheathed-element glow plugs 21 to 24 at both the 5 V voltage and the 7 V voltage, it can safely be assumed that none of the sheathed-element glow plugs 21 to 24 has been replaced.

If, however, the following is measured at a voltage of 6 V:
I1=3.5 A, I2=3.4 A, I3=3.5 A, I4=3.3 A,
this yields the following pattern:

$$I4 < I2 < I1 = I3.$$

It is evident from this that the pattern has changed with respect to the pattern explained previously. Because only the value of the plug current of plug 24 has changed, it can be inferred therefrom that sheathed-element glow plug 24 has been switched out.

Because the comparison of the stored values occurs under specific engine conditions (e.g. injector quantity, engine speed, and the like), no attention need be paid to these environmental conditions, or wider tolerance ranges can be permitted. Pattern creation allows the limit values of the engine conditions, and the threshold values for detecting a plug replacement, to be construed more broadly.

What is claimed is:

1. A method for detecting a replacement of a sheathed-element glow plug in an internal combustion engine, comprising:

determining in a selected driving cycle a value of a selected electrical parameter for each one of sheathed-element glow plugs installed in the internal combustion engine, the same electrical parameter being determined for all sheathed-element glow plugs, wherein the values of the selected electrical parameter of the sheathed-element glow plugs determined in the selected driving cycle define a first specific pattern when the determined values are viewed in relation to one another;

comparing the first specific pattern with a second specific pattern of stored values of the selected electrical parameter of the sheathed-element glow plugs determined in a driving cycle preceding the selected driving cycle; and determining an occurrence of a replacement of a sheathed-element glow plug if the first and second specific patterns deviate from one another.

2. The method as recited in claim 1, wherein each one of the first and second specific patterns is defined by the relative magnitudes of the selected electrical parameter for the sheathed-element glow plugs installed in the internal combustion engine.

3. The method as recited in claim 2, wherein for each one of the first and second specific patterns, the selected electrical parameter is measured for all sheathed-element glow plugs at approximately the same point in time.

4. The method as recited in claim 3, wherein the electrical parameter is one of a current parameter, a resistance parameter, or a power level of the sheathed-element glow plugs.

5. The method as recited in claim 4, wherein the resistance parameter is one of a cold resistance, a hot resistance, or a resistance change.

6. A method for detecting a replacement of a sheathed-element glow plug in an internal combustion engine, comprising:

determining in a selected driving cycle a value of a selected electrical parameter for each one of sheathed-element glow plugs installed in the internal combustion engine, the same electrical parameter being determined for all sheathed-element glow plugs, wherein the values of the selected electrical parameter of the sheathed-element glow plugs determined in the selected driving cycle define a first specific pattern when the determined values are viewed in relation to one another;

comparing the first specific pattern with multiple second specific patterns of stored values of the selected electrical parameter of the sheathed-element glow plugs determined in corresponding multiple driving cycles preceding the selected driving cycle; and determining an occurrence of a replacement of a sheathed-element glow plug if the first specific pattern exhibits a discontinuity from the multiple second specific patterns.

7. An apparatus for detecting a replacement of a sheathed-element glow plug in an internal combustion engine, comprising:

a measurement unit for measuring in a selected driving cycle a value of a selected electrical parameter for each one of sheathed-element glow plugs installed in the internal combustion engine, the same electrical parameter being determined for all sheathed-element glow plugs, wherein the values of the selected electrical parameter of the sheathed-element glow plugs determined in the selected driving cycle define a first specific pattern when the determined values are viewed in relation to one another;

a memory unit for storing a second specific pattern of stored values of the selected electrical parameter of the sheathed-element glow plugs determined in a driving cycle preceding the selected driving cycle; and a pattern recognition unit connected to the measurement unit and to the memory unit, wherein the pattern recognition unit (i) compares the first specific pattern with the second specific pattern of stored values, and (ii) determines an occurrence of a replacement of a sheathed-element glow plug if the first and second specific patterns deviate from one.

* * * * *